United States Patent [19]

Starkweather et al.

[11] 4,162,121
[45] Jul. 24, 1979

[54] LINEAR ARRAY MODULATOR

[75] Inventors: Gary K. Starkweather, Saratoga; John C. Urbach, Portola Valley, both of Calif.

[73] Assignee: Xerox Corporation, Stamford, Conn.

[21] Appl. No.: 787,406

[22] Filed: Apr. 14, 1977

[51] Int. Cl.² ............................................. G02F 1/33
[52] U.S. Cl. ................................................. 350/358
[58] Field of Search .............. 350/160 R, 161 W, 358; 331/94.5 K, 94.5 M, 94.5 Q

[56] References Cited
U.S. PATENT DOCUMENTS

| 3,988,055 | 10/1976 | McNaney | 350/160 R |
| 4,032,220 | 6/1977 | McNaney | 350/161 W |

Primary Examiner—William L. Sikes

[57] ABSTRACT

An acousto-optic device including an acousto-optic medium having a plurality of closely spaced transducers bonded thereto in a linear array. A signal of the same frequency is supplied to those transducers which are to diffract out or deflect elemental portions of a light beam incident upon the acousto-optic medium to thereby provide a plurality of light spots which can be written in parallel.

4 Claims, 4 Drawing Figures

LINEAR ARRAY MODULATOR

BACKGROUND OF THE INVENTION

Acousto-optic devices usually consist of an electrically driven piezo-electric transducer bonded to an acousto-optic media. An acoustic strain wave, provided when the transducer is electrically addressed, modulates the refractive index of the acousto-optic media which in turn diffracts light in a preferred direction when light incident on the acousto-optic media is near the Bragg angle. The acousto-optic media acts as a grating, the grating period being equal to the wavelength of the sound wave in the media.

Such acousto-optic devices have applications in optical memory systems, acoustic delay lines, light modulators, and printing and display systems. In the latter applications, the acousto-optic device is utilized to diffract a high intensity light beam such that it sweeps across a light sensitive surface or is directed to selected spots on the light sensitive surface. Such light diffraction is conventionally achieved by utilizing a single transducer and simultaneously supplying signals of different frequencies to the transducer. Since the different frequencies of the supplied signals cause the acousto-optic media to have a multiplicity of sound waves with different grating periods, a light beam incident on the acousto-optic media will ideally be diffracted at angles corresponding in number to the number of supplied frequencies whereby a number of light spots corresponding to the number of supplied frequencies is provided at the light sensitive medium.

In such multi-frequency signal systems, the frequencies of the signals utilized must be carefully selected so that beat frequency signals resulting from the sum and differences of the supplied signals does not cause light to be diffracted out of the acousto-optic media at angles that will produce undesired light spots on the light sensitive medium. If the number of desired light spots is in the neighborhood of 10-20, the beat frequency signals are easily avoided by proper frequency selection. However, proper frequency selection becomes a major problem when it is desired to diffract out a hundred or more light spots.

OBJECTS OF THE INVENTION

It is an object of the present invention to provide an improved acousto-optic device.

It is a further object of the present invention to provide an improved acousto-optic device for utilization in display and printing systems.

It is another object of the present invention to provide an acousto-optic device which can diffract a large plurality of light spots for writing in parallel.

SUMMARY OF THE INVENTION

In accordance with the invention, an acousto-optic media has a plurality of closely spaced transducers bonded thereto in a linear array. Each transducer is coupled to a conventional control circuit which supplies a signal of the same radio frequency to each of the transducers that is addressed by the control circuit. A light beam incident on the acousto-optic media is diffracted out of the acousto-optic media in a direct relationship with the transducers that receive the single frequency signal. By utilizing a single frequency to diffract out all of the desired light spots, the problem of beat frequency signals is avoided and the number of spots that can be diffracted out is limited only by the number of transducers that can be bonded to the acousto-optic media and the ability to energize those transducers.

The proposed acousto-optic device can be utilized as a component of a printing or display system. The printing or display system would be economical and reliable since the proposed acousto-optic device would eliminate the conventional scanner and amplitude modulator of such systems and would eliminate many of the optical components of such systems.

DETAILED DESCRIPTION OF THE INVENTION

Figure 1:
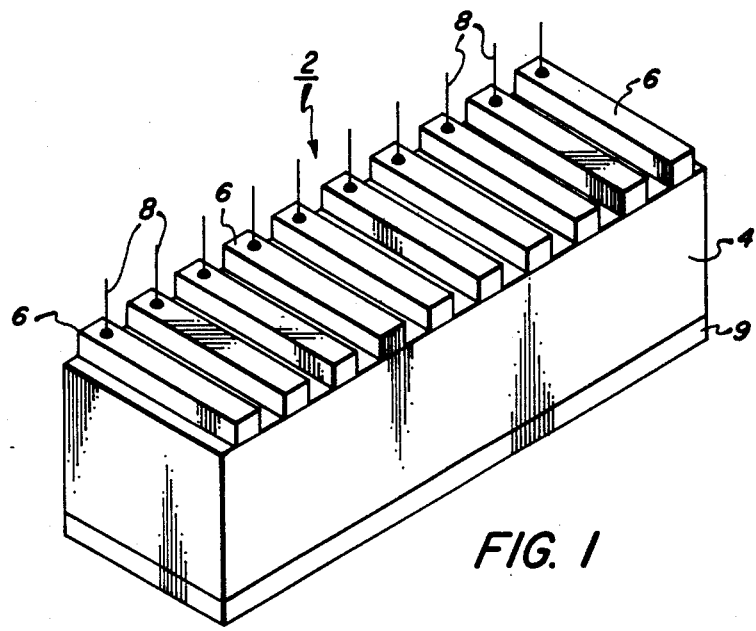
FIG. 1 is a schematic representation of an acousto-optic device in accordance with the invention.

Referring now to FIG. 1 there is shown an acousto-optic device 2 in accordance with the invention. Device 2 includes an acousto-optic media 4 which has a plurality of transducers 6 bonded thereto along its length in a linear array. Each of the transducers 6 has a lead wire 8 connected thereto so that a radio frequency signal can be appropriately supplied (by conventional means not shown) to those transducers having a location corresponding to the location where a light spot is to be diffracted out of the acousto-optic media 4. An electrode 9, maintained at a reference potential, such as ground, is connected to the acousto-optic media 4 on the side thereof opposite the transducers 6. The transducers 6 and the acousto-optic media 4 described herein are made of conventional materials and have conventional configurations. Transducers 6 can be made of lithium niobate, sodium potassium niobate, lithium gallate, quartz, lead-titanium dioxide-zirconia ceramic and the like. Acousto-optic media 4 can be a ferroelectric material such as lead molybdate, lead tungstate, barium sodium molybdate, and other high refractive index materials such as telluride glass and the like. Also, acousto-optic media 4 can be a thermoplastic such as polysulfone or an acrylic resin such as polymethylmethacrylate. The transducers 6 are bonded to the acousto-optic media 4 in a conventional manner such as by the bonding method disclosed in U.S. Pat. No. 3,798,746 or, when the acousto-optic media is a thermoplastic or a resin, by the injection molding technique disclosed in U.S. Pat. No. 3,938,881.

Figure 2A:
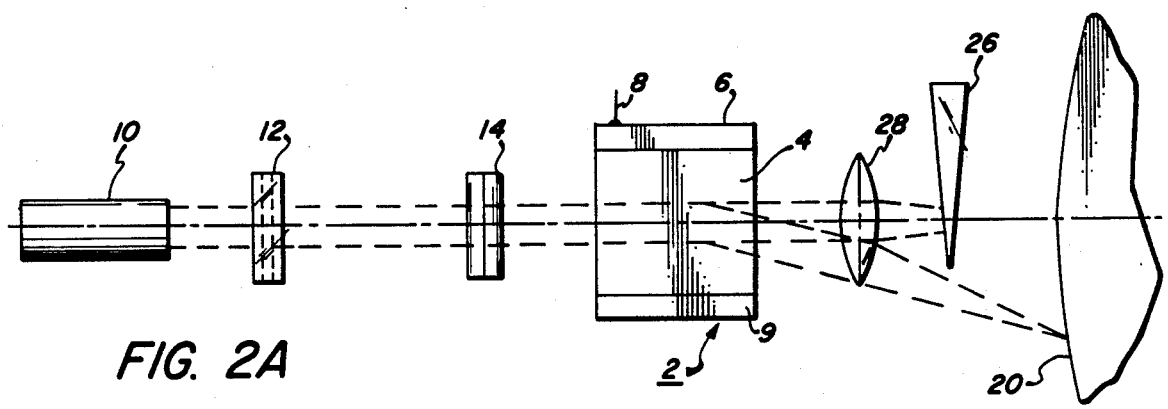
FIGS. 2A and 2B are side and top views, respectively, of the system of FIG. 2.
Figure 2B:
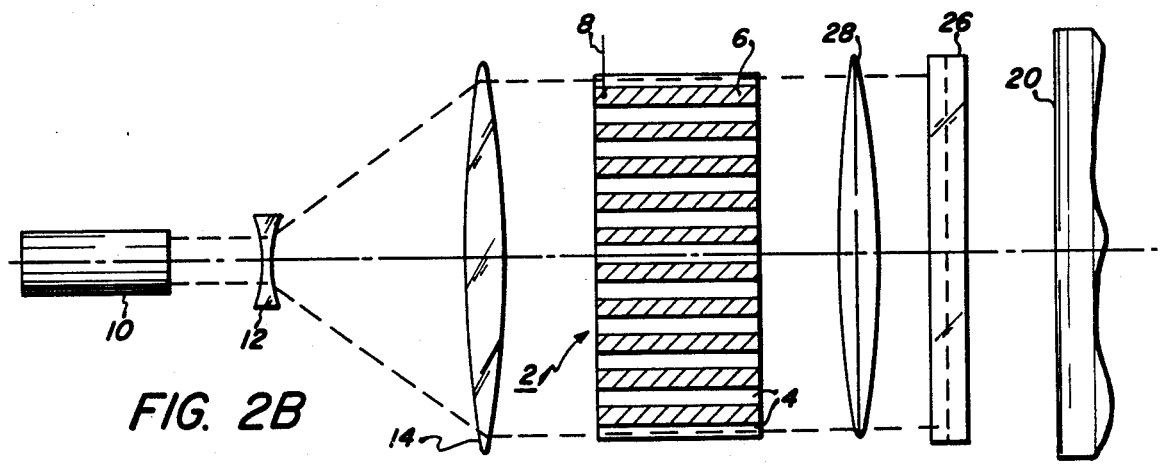
Figure 2:
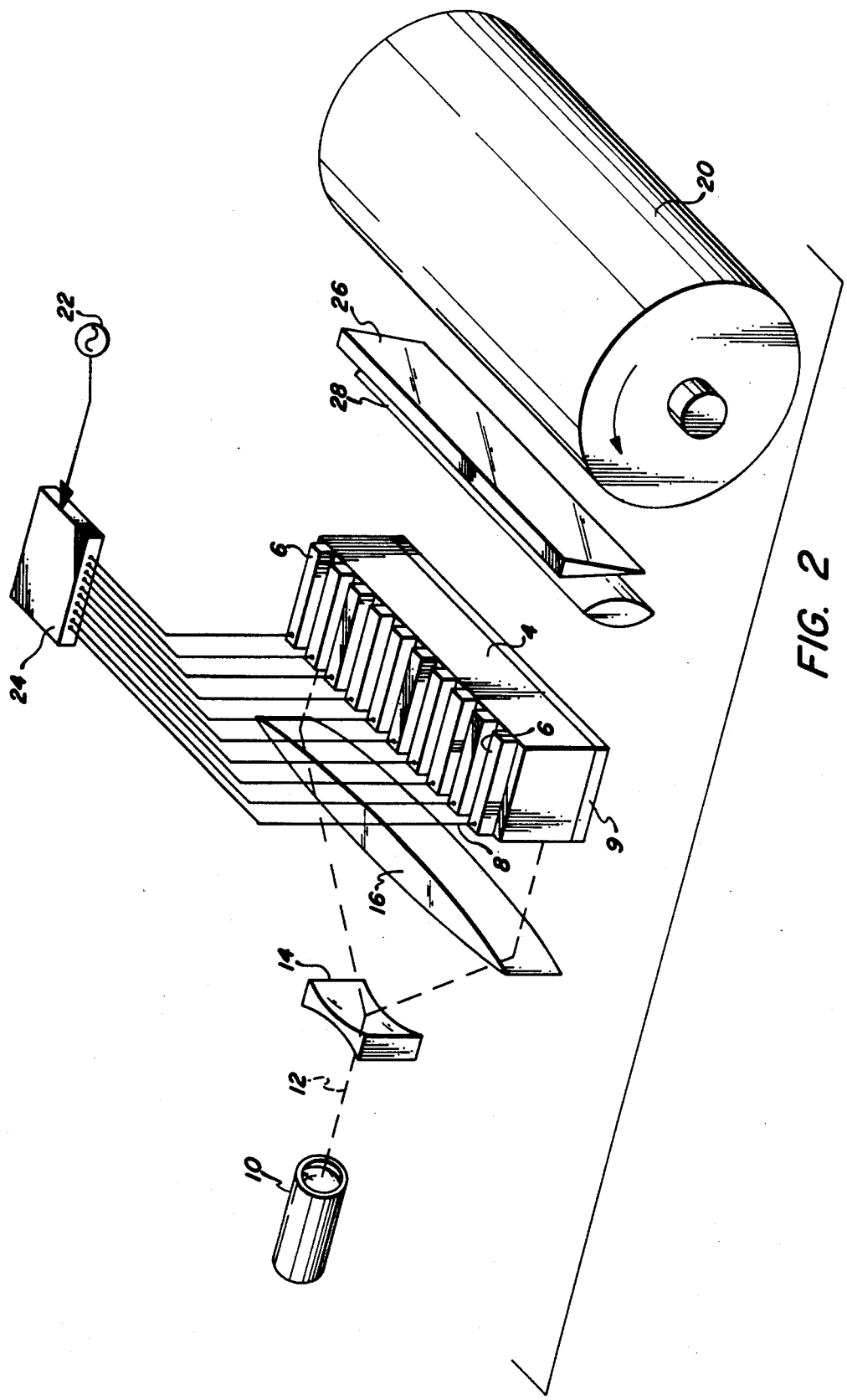
FIG. 2 depicts symbolically a printing system utilizing the acousto-optic device of FIG. 1.

Referring now to FIGS. 2, 2A and 2B there is shown an exemplary printing system utilizing the acousto-optic device 2. A source 10 of high intensity light, such as a laser, emits a light beam 12 which is expanded by cylinder lenses 14 and 16. The expanded light beam is incident along the entire length of the acousto-optic device 2 which, as noted, includes an acousto-optic media 4 with a plurality of closely placed transducers 6 bonded thereto along its length. Each of the transducers 6 corresponds to a spot which can be printed on a photo-sensitive medium such as photo-sensitive drum 20.

The transducer lead wires 8 are connected to a conventional switching circuit 24 which receives a radio frequency signal of a fixed frequency from source 22. Circuit 24 is adapted to receive control signals which gate selected circuits of the control circuit so that the fixed frequency signal from source 22 is supplied simultaneously to those transducers corresponding in alignment with desired locations of light spots on the photosensitive drum 20. That is, a plurality of light spots can be written in parallel at desired locations on drum 20 by connecting those transducers corresponding in alignment with those desired locations to the source 22.

The portions of the expanded light beam not diffracted by the device 2 are intercepted by a light opaque stop 26 and thus are not incident upon drum 20. The portions of the expanded light beam diffracted out (downwardly) by the waves produced by the addressed transducers avoid the stop 26. The diffracted light is focused by the strip lens 28 so that light spots are written in parallel on the drum 20.

It is conceived that as many as 4,000 transducers may be bonded to a block of an acousto-optic material on the order of 11 inches long. This would allow 4,000 light spots to be written in parallel if desired. An advantage of such a system is its simplicity since it would eliminate the scanner, modulator and virtually all of the optical system of conventional spot scanning printing systems.

We claim:

1. An optical system including:
   means for providing a high intensity light beam of large area,
   an acousto-optic device disposed in the path of said light beam and including an acousto-optic media having a plurality of transducers bonded thereto, each of said transducers having an electrode associated therewith,
   first means for providing a radio frequency signal,
   second means coupled to said electrodes and said first means for supplying said radio frequency signal simultaneously to selected of said transducers whereby sound waves are provided within the portions of said media aligned with said selected transducers and portions of said light beam are simultaneously diffracted by said sound waves, and
   a light sensitive medium disposed to receive simultaneously said portions of said light beam diffracted by said sound waves whereby spots of light are written in parallel on said light sensitive medium.

2. The system of claim 1 wherein said transducers are disposed in a linear array along said acousto-optic medium.

3. The system of claim 1 further including means for preventing undiffracted portions of said light beam from being received by said light sensitive medium.

4. An optical system including:
   first means for providing a high intensity light beam of large area,
   an acousto-optic device disposed in the path of said light beam and including an acousto-optic media having a plurality of transducers bonded thereto, each of said transducers having an electrode associated therewith,
   second means for providing a radio frequency signal,
   third means coupled to said electrodes and said second means for supplying said radio frequency signal simultaneously to selected to said transducers whereby sound waves are provided within the portions of said media aligned with said selected transducers and portions of said light beam are simultaneously diffracted by said sound waves,
   a light sensitive medium disposed to receive simultaneously said portions of said light beam diffracted by said sound waves whereby spots of light are written in parallel on said light sensitive medium, and
   fourth means disposed between said acousto-optic device and said light sensitive medium for preventing undiffracted portions of said light beam from being received by said light sensitive medium.

* * * * *